3,415,655
MILK PRODUCT CONTAINING FREE AMINO ACIDS AND METHOD OF PREPARING THE SAME

Tetsuo Hino, Tokyo, Koichi Hayashi, Kanagawa-ken, and Noriko Iizuka, Tokyo, Japan, assignors to Ajinomoto Co., Inc., Tokyo, Japan
No Drawing. Filed Oct. 19, 1965, Ser. No. 498,137
6 Claims. (Cl. 99—54)

This invention relates to a cow's milk product modified for improved nutritional value, and to a method of enhancing the nutritional value of cow's milk products.

Cow's milk is known to be unsuited as the sole or principal source of human nourishment whereas human milk can supply all nutrients required by humans, particularly infants. One of the most important differences between cow's milk and human milk resides in the distribution of constituent amino acids in bovine and human milk proteins. Cow's milk protein is deficient in methionine and tryptophan as compared to human milk protein, and the nutritional value of cow's milk can be substantially enhanced by adding free methionine and free tryptophan thereto. These amino acids are very well tolerated in the amounts required, and are readily admixed to fluid milk, milk concentrates, such as evaporated milk or condensed milk, and to dry milk prepared from whole milk or from skim milk.

Methionine and tryptophan, however, impair the taste and odor of milk products, and fresh or reconstituted cow's milk containing an amount of tryptophan and/or methionine substantially corresponding to the deficiency of the milk protein in these amino acids as compared to human milk is unfit for general human consumption for this reason. Amounts of methionine and tryptophan which do not deleteriously affect the taste and aroma of cow's milk or cow's milk products are too small to have significant nutritional value, while amounts of these amino acids which are truly beneficial not only impart their own characteristic taste and odor to the product but they also suppress the characteristic taste of milk which is found even in evaporated milk or in milk reconstituted from dry skim milk, and makes the liquid product readily distinguishable from cow's milk which tryptophan and methionine are not added.

The amount of methionine necessary for making up the deficiency of cow's milk as compared to human milk is approximately 50 to 100 mg. of methionine per gram of protein nitrogen in the cow's milk, or per 6.39 g. of cow's milk protein. The corresponding amount of tryptophan is between 10 and 20 mg. While these values are characteristic of normal cow's milk and normal human milk, differences somewhat outside these limits may exist, and may require corresponding additions to cow's milk for compensation.

We have found that the undesirable effects of methionine and/or tryptophan on the taste and odor of cow's milk and the afore-mentioned derivatives of cow's milk, hereinafter jointly referred to as milk products, can be avoided by additionally admixing to such milk products monosodium glutamate and at least one amino acid of the group consisting of glycine, alanine, serine and threonine. The invention thus mainly resides in an enriched milk product which contains the protein of natural cow's milk, at least one of the amino acids methionine and tryptophan in an amount substantially corresponding to the deficiency of the cow's milk protein in these amino acid acids, monosodium glutamate, and at least one of the four amino acids of the afore-mentioned group of glycerine, alanine, serine and threonine.

In another aspect, the invention resides in a method of enhancing the nutritional value of a milk product such as fluid cow's milk, a liquid milk concentrate, such as evaporated or condensed milk, and dry cow's milk by admixing thereto the additives referred to in the preceding paragraph.

Unless stated otherwise, the amino acids referred to herein are the naturally occurring optical isomers (L-form), and it will be understood that the term monosodium glutamate refers to the monosodium salt of L-glutamic acid.

The amounts of monosodium glutamate and of one of the afore-mentioned four amino acids necessary for overcoming the effects of methionine and tryptophan on the taste and aroma of milk are between 5 and 30 percent of the indispensible amino acids methionine and tryptophan. A milk product indistinguishable from a control sample not containing any additives is obtained when the glutamate and one or members of the group of the four mentioned amino acids are present in about equal amount of 10 to 20 percent of the amount of the indispensable amino acid or acids.

The effects of various amino acids and amino acid salts on the taste of fresh cow's milk reinforced with 0.05% methionine and 0.01% tryptophan were as follows:

The reinforced milk had the strong odor and bad aftertaste characteristic of methionine. It was somewhat bitter, as is characteristic of tryptophan, and had little milk taste and aroma.

The milk taste was more noticeable with the addition of 0.006% alanine, glycine, serine or threonine, but the methionine odor was still too strong to make the milk palatable.

Proline produced only a slight improvement as to milk taste and methionine odor, and imparted a sweetish taste of its own when added in an amount of 0.006%. Phenylalanine, leucine, isoleucine, and valine were also useless, and tended to reduce the milk taste in plain cow's milk.

The hydrochlorides of arginine and histidine did not produce any improvement in the taste of reinforced milk.

Monosodium aspartate in an amount of 0.006% restored the milk taste to a small extent but could not restore the sweetness of ordinary cow's milk.

0.006% monosodium glutamate fully restored the milk taste and completely obliterated the methionine odor but the treated milk was somewhat lacking in sweetness.

The flavor and aroma of the reinforced milk could not be distinguished from that of the original cow's milk after addition of 0.006% each of monosodium glutamate and glycine.

The other three amino acids of the afore-mentioned group are similarly capable of restoring sweetness to milk which contains methionine, tryptophan, and enough monosodium glutamate to overcome the odor and other taste effects of the indispensible amino acids added. The sweetening effect of alanine is approximately equal to that of 1.2 weights glycine, and the glycine equivalents of serine and threonine are 0.8 and 0.44 weights, respectively.

0.002 percent of each of monosodium glutamate and glycine could not satisfactorily overcome the methionine odor nor restore the milk taste in the opinion of a panel of trained tasters. They considered 0.005% each of monosodium glutamate and glycine fully to restore the original's cow's milk aroma and taste. At higher concentrations of glutamate and glycine, more tasters objected to the increasing prevalence of the taste of the addition agents. 0.01% were still considered good by most tasters. The objectors almost prevailed at 0.02%, and a reinforced milk containing 0.05% each of monosidium glutamate and glycine was almost unanimously rejected.

The results were similar when the glycine was replaced partly or entirely by ananine, serine and/or threonine in amounts having comparable sweetening effects.

Rather astonishingly, replacement of the sweet tasting amino acids by more conventional sweetening agents such as glucose and sucrose in any proportion, or by artificial sweeteners, resulted in a product which was readily distinguished by a majority of the panel members from original cow's milk. The specific sweetening effect of the amino acids mentioned above is believed to be related to the fact that they buffer the liquid milk product to the slightly alkaline to neutral pH value of ordinary cow's milk in a manner not possible with carbohydrates or the conventional synthetic sweetening agents.

The following examples are taken from the records of tasting panels employed for evaluating this invention but the volume of these records makes it impractical to set them forth in full in this specification.

Example 1

Commercial dry milk containing 16% protein by weight was intimately mixed with 0.3% DL-methionine and 0.06% L-tryptophan. Samples of a 15% solution of the mixture in warm water were submitted to a 40-member panel for comparison with a control solution free from added methionine and tryptophan. Thirty panel members declared the two samples to be substantially different in taste and aroma. Of the 30 panel members asked for a preference between the two samples, 25 preferred the control sample.

The original dry mixture was further mixed with 0.036% monosodium glutamate, and the panel was again asked to determine the difference between a 15% solution in water and a control sample made up from the original dry milk. There was some preference for the control samples, and recognition of a difference by some panel members but the panel was too small to make the results statistically conclusive.

The addition of 0.018% glycine and 0.018% DL-alanine to the mixture of dry milk with methionine and tryptophan produced a liquid sample which was considered different from the control sample by a statistically significant number of panel members but the results of a preference test were not statistically conclusive. There were some complaints about a strange odor in the methionine bearing mixture.

A sample of dry milk, methionine and tryptophan, when further mixed with 0.036% monosodium glutamate, 0.018% DL-alanine and 0.018% glycine could not be distinguished from a control sample by a 40-member panel, and there was no statement of significant preference.

Example 2

Commercial fluid cow's milk containing 2.9% crude protein was partly mixed with 0.05% DL-methionine and 0.01% tryptophan. A sample of this material was considered different from an untreated milk sample by 40 panel members at the 1% significance level. 27 members of a 30 member panel preferred the control to the treated sample (significant on the 0.1% level). Those panel members who preferred the control objected to the methionine odor and the lack of milk taste in the treated sample.

When the treated milk was additionally mixed with 0.005% monosidium glutamate, 0.004% glycine and 0.004% DL-alanine, only eleven members of a panel of forty members found a difference between treated sample and control, and the eleven were about evenly split as to their preference for the sample or the control.

In a third test, the glycine and alanine of the preceding test were replaced by 0.002% each of glycine, DL-alanine, L-serine, and L-threonine. The results were approximately the same. Several panel members indicated that the taste of the treated sample was somewhat stronger than that of the control.

Example 3

Evaporated milk containing 6.8% crude protein was mixed with 0.1% DL-methionine and 0.02% L-tryptophan, and two batches of this mixture and corresponding batches of untreated evaporated milk were diluted with about 2½ parts water. The difference between a sample of one treated batch and the control was recognized by 29 of the 40 panel members, and 25 of the 29 recognizing a difference preferred the control.

The other treated batch was mixed with 0.01% monosodium glutamate, 0.04% DL-serine and 0.04% DL-threonine, based on the weight of the original evaporated milk. Of the forty panel members questioned, fourteen claimed to notice a difference between the treated sample and the control, but the 14 noticing a difference were about equally divided as to their preference between the sample and the control.

While the invention has been described with particular reference to specific embodiments, it is to be understood that it is not limited thereto, but is to be construed broadly and restricted solely by the scope of the appended claims.

What we claim is:

1. A milk product selected from the group of fluid cow's milk, liquid cow's milk concentrate, and dry cow's milk containing at least one free indispensible amino acid selected from a first group consisting of tryptophan and methionine in an amount substantially corresponding to the deficiency of said protein in said amino acid as compared to human milk, monosodium glutamate, and at least one free amino acid selected from a second group consisting of glycine, alanine, serine, and threonine, said monosodium glutamate and said amino acid of the second group being each present in said milk product in an amount of 5 to 30 percent of the amount of said indispensible amino acid.

2. A product as set forth in claim 1, which is dry milk having said amino acids of said first and second groups and said monosodium glutamate admixed thereto.

3. A product as set forth in claim 1, which is fluid cow's milk having said amino acids of said first and second groups and said monosodium glutamate admixed thereto.

4. A method of enhancing the nutritional value of a milk product selected from the group of fluid cow's milk, liquid cow's milk concentrate, and dry cow's milk which comprises admixing to said milk product at least one free indispensible amino acid selected from a first group consisting of tryptophan and methionine in an amount substantially corresponding to the deficiency of the cow's milk protein in said product with respect to said amino acid as compared to human milk, monosodium glutamate, and at least one free amino acid selected from a second group consisting of glycine, alanine, serine, and threonine, said monosodium glutamate and said amino acid of the second group being added to said milk product in an amount of 5 to 30 percent of said indispensible amino acid.

5. A method as set forth in claim 4, wherein the amounts of said monosodium glutamate and of said amino acid of said second group are approximately equal and between 10 and 20 percent of the amount of said indispensible amino acid.

6. A method as set forth in claim 5, wherein approximately 50 to 100 milligrams methionine and 10 to 20 milligrams tryptophan are admixed to said milk product for each gram of nitrogen in the cow's milk protein of said product.

References Cited

UNITED STATES PATENTS

| | | | |
|---|---|---|---|
| 2,344,229 | 3/1944 | Block et al. | 99—14 X |
| 2,738,299 | 3/1956 | Frost et al. | 99—14 X |
| 3,080,234 | 3/1963 | Jarowski | 99—14 |
| 3,231,385 | 1/1966 | Ziro et al. | 99—54 |
| 3,320,072 | 5/1967 | Clark et al. | 99—54 X |

FOREIGN PATENTS 665,204  1/1952  Great Britain.

A. LOUIS MONACELL, *Primary Examiner.*

D. M. NAFF, *Assistant Examiner.*

U.S. Cl. X.R.

99—14, 19